United States Patent [19]

Morimoto

[11] Patent Number: 5,480,246
[45] Date of Patent: Jan. 2, 1996

[54] TAPE PRINTING APPARATUS

[75] Inventor: Yoshinari Morimoto, Nagoya, Japan

[73] Assignee: Brother Kogyo Kabushiki Kaisha, Nagoya, Japan

[21] Appl. No.: 95,216

[22] Filed: Jul. 23, 1993

[30] Foreign Application Priority Data

Sep. 29, 1992 [JP] Japan .................... 4-285251

[51] Int. Cl.⁶ .................................. B41J 3/39
[52] U.S. Cl. ................ 400/615.2; 400/63; 400/76
[58] Field of Search ................... 400/615.2, 83, 400/61, 76, 63; 345/173, 179

[56] References Cited

U.S. PATENT DOCUMENTS

| | | | |
|---|---|---|---|
| 4,706,096 | 11/1987 | Sato | 400/103 |
| 4,836,697 | 6/1989 | Plotnick | 400/615.2 |
| 5,003,505 | 3/1991 | McClelland | 345/173 |
| 5,021,975 | 6/1991 | Yamanashi | 400/104 |
| 5,149,211 | 9/1992 | Pettigrew et al. | 400/88 |
| 5,228,124 | 7/1993 | Kaga | 345/179 |
| 5,294,202 | 3/1994 | Sawada | 400/103 |

OTHER PUBLICATIONS

Microsoft User's Reference Manual pp. 256–260 1990.

*Primary Examiner*—Edgar S. Burr
*Assistant Examiner*—Steven S. Kelley
*Attorney, Agent, or Firm*—Oliff & Berridge

[57] ABSTRACT

A tape printing apparatus having a RAM divided into a character data storage area, a handwritten data storage area and a read data storage area. Data on characters, number and symbols entered from a keyboard are stored in the character data storage area; handwritten data, such as graphic forms entered from an electronic pen and a touch-sensitive panel, are stored in the handwritten data storage area; and image data read in through an image scanner are stored in the read data storage area. Thus, the data are stored independently in their respective storage areas. The data, both characters and graphic forms, can then be edited and printed concurrently onto a tape.

17 Claims, 10 Drawing Sheets

Fig.9B

| ITEM | INSTRUCTIONS |
|---|---|
| S70 | ENTER FUNCTION SELECTION MODE IN WHICH TO SELECT PRINTING OF CURRENT DATA OR TEXT DATA; TO DESIGNATE TAPE WIDTH; TO DESIGNATE PRINT COLOR; TO DESIGNATE AUTO MODE FOR PRINTING TEXT; TO EXECUTE PRINTING; OR TO TERMINATE PRINT MODE |
| S71 | WHICH FUNCTION IS SELECTED ? |
| S72 | PRINT CURRENT DATA ? |
| S73 | WIDE TAPE LOADED ? |
| S74 | SET DATA DISPLAYED ON DISPLAY PART AS PRINT DATA |
| S75 | SET TEXT DATA AS PRINT DATA; CHECK TO SEE IF TEXT DATA ARE PRINTABLE IN VIEW OF TAPE WIDTH, CHARACTER SIZE AND PRINT LINE COUNT; WITH AUTO MODE IN EFFECT, ADJUST CHARACTER SIZE; IF ADJUSTMENTS FAIL TO MAKE TEXT DATA PRINTABLE, RECOGNIZE ERROR |
| S76 | ERROR ? |
| S77 | PRINT DESIGNATE PRINT DATA IN CURRENT PRINT COLOR |
| S78 | ACTIVATE BELL AND DISPLAY ERROR INDICATION |
| S79 | DESIGNATE PRINTING OF CURRENT DATA OR TEXT DATA |
| S80 | CHOOSE COLOR FROM AMONG BLACK, WHITE, RED AND BLUE |
| S81 | TURN ON OR OFF AUTO MODE |
| S82 | AUTO MODE ? |
| S83 | ADJUST CURRENT DATA SIZE ACCORDING TO TAPE WIDTH |

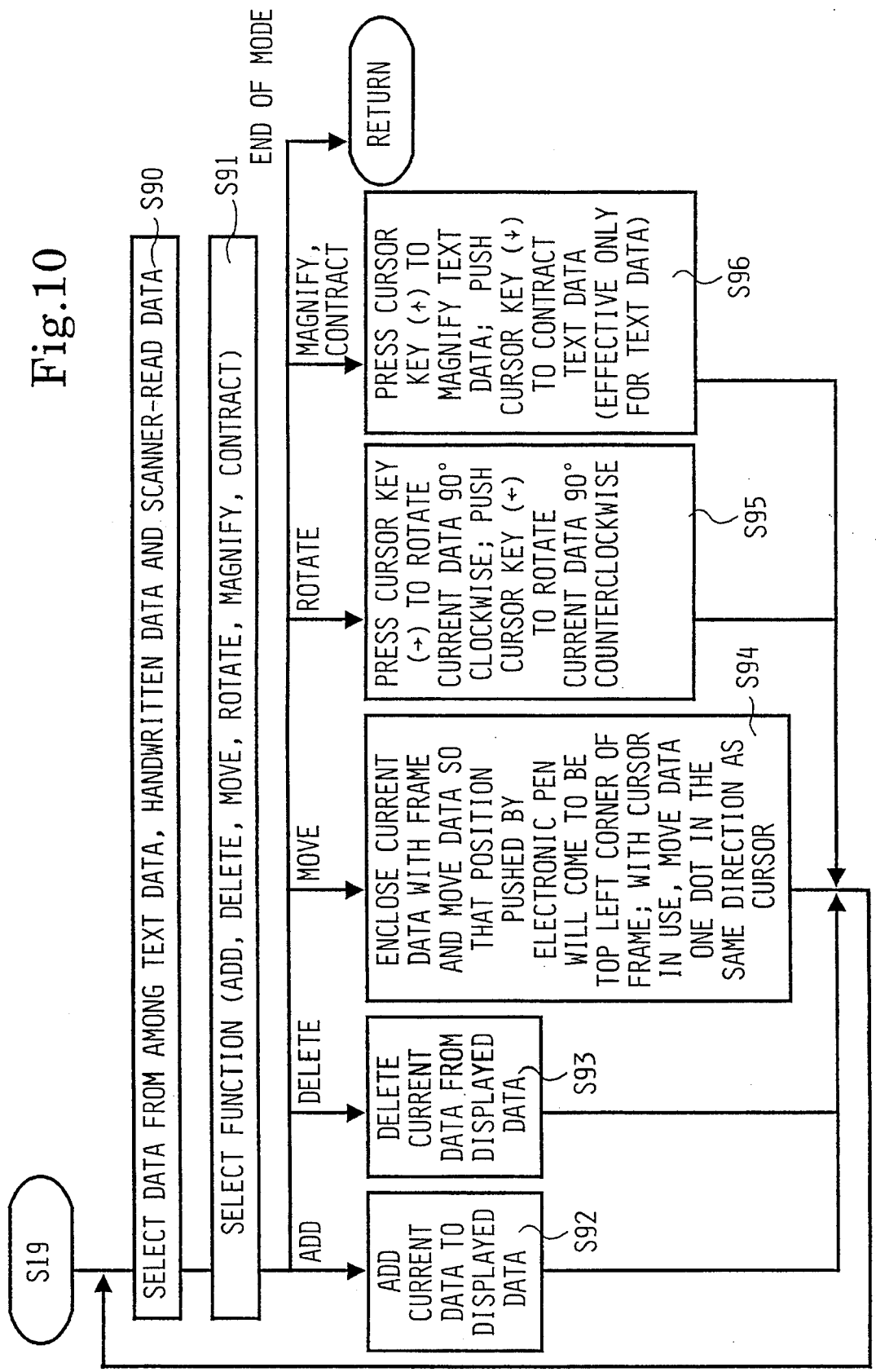

TAPE PRINTING APPARATUS

BACKGROUND OF THE INVENTION

1. Field of the Invention

The invention relates to a tape printing apparatus for printing characters, numbers and symbols onto a longitudinally elongated tape. More particularly, the invention relates to a tape printing apparatus capable of printing concurrently combinations of character data (representing characters) and image data (representing graphic forms) onto a longitudinally elongated wide tape.

2. Description of the Related Art

A variety of tape printing apparatuses have been proposed. Most of these conventional tape printing apparatuses are designed to create a tape on which characters and other symbols have been printed. The tape thus printed is used illustratively as indices for video cassettes and like articles.

Over the years, users of such tape printing apparatuses have demanded a growing number of features. Today, what is desired in particular of the tape printing apparatus is the ability to print not only characters but also images, i.e., graphic forms. Such a capability is missing with conventional tape printing apparatuses; they are capable of creating only character-printed tapes.

SUMMARY OF THE INVENTION

It is therefore an object of the invention to overcome the above-described drawbacks of the prior art and to provide a tape printing apparatus capable of concurrently printing combinations of characters and images onto a longitudinally elongated wide tape.

In carrying out the invention and according to one aspect thereof, there is provided a tape printing apparatus having character data input means and print means, the print means receiving from the character data input means the character data for printing characters, numbers and symbols onto a tape, the tape printing apparatus comprising: image data input means for inputting image data representing graphic forms; display means for displaying the data received from the character data input means and from the image data input means; storage means for storing independently the character data from the character data input means and the image data from the image data input means; designating means for designating a combination type in which to combine the character data and image data retrieved from the storage means; and data processing means for combining the character data and image data in accordance with the combination type designated by the designating means.

In operation, the character data (representing characters) input from the character data input means and the image data (representing graphic forms) input from the image data input means are stored independently in the storage means while being displayed on the display means at the same time. When a combination type, defining how to combine the character and image data, is designated by the designating means, the data processing means combines the two kinds of data accordingly. Thereafter, the combined character and image data are printed by the print means onto the tape.

As outlined, the tape printing apparatus according to the invention allows both characters and graphic forms to be printed concurrently and in combination onto the tape. The ability to print the two kinds of characters combined is a significant improvement over the prior art.

BRIEF DESCRIPTION OF THE DRAWINGS

The invention will be described with reference to the drawings in which:

FIG. 9B is a table of labels for the flowchart of FIG. 9A; and FIG. 10 is a flowchart of steps of an edit processing program for dealing with characters and graphic forms in conjunction with the embodiment.

DETAILED DESCRIPTION OF THE PREFERRED EMBODIMENTS

Figure 1:
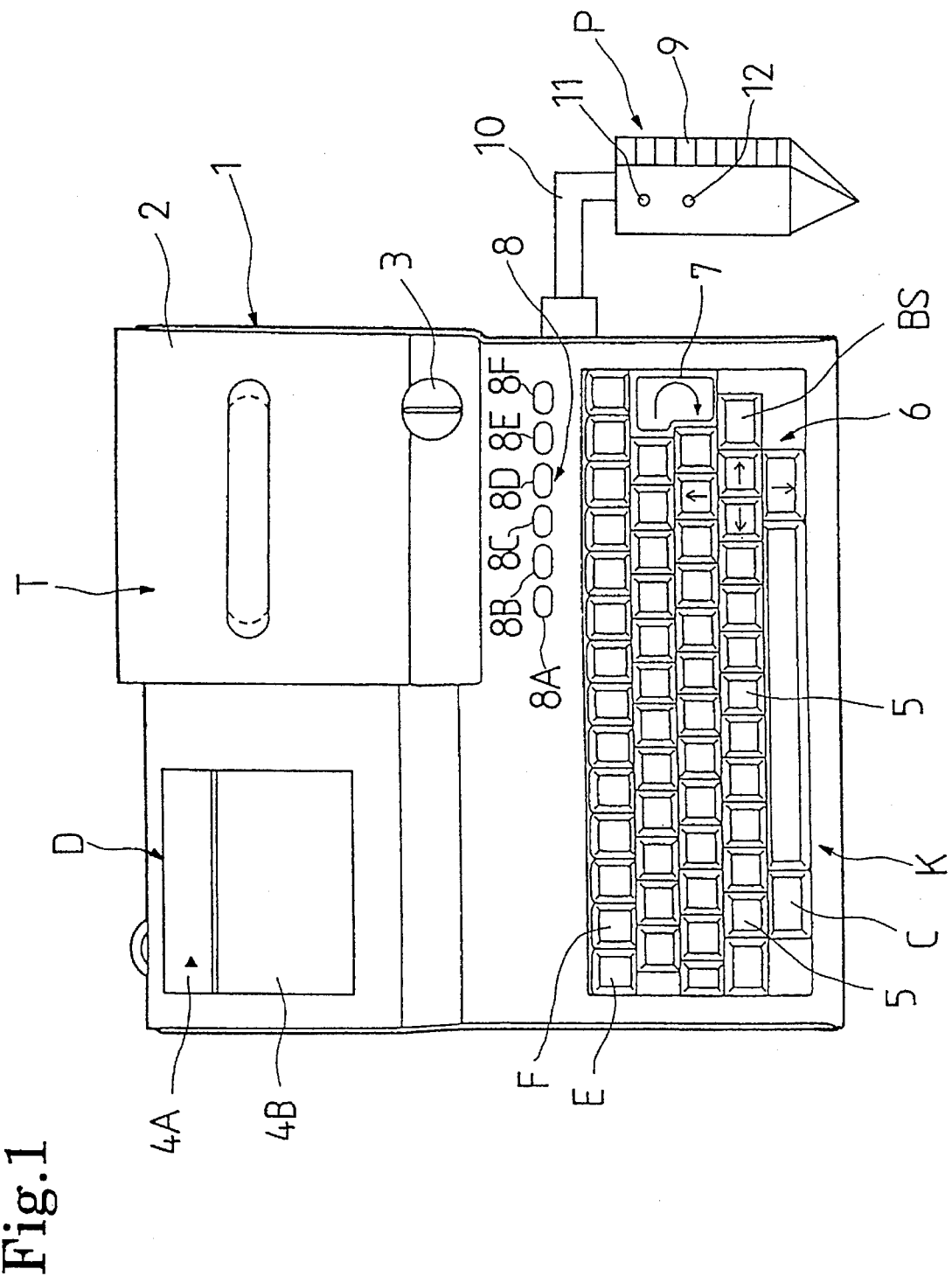
FIG. 1 is a plan view of a tape printing apparatus embodying the invention.

One preferred embodiment of the invention will now be described with reference to the accompanying drawings. FIG. 1 is a plan view of a tape printing apparatus embodying the invention. In FIG. 1, the tape printing apparatus 1 comprises a tape cassette accommodating section T in the right rear (top right in the figure), a display device D in the left rear, a keyboard K at the front (bottom in the figure), and an electronic pen P extending from a front right-hand position of the apparatus body.

The tape cassette accommodating section T accommodates a known tape cassette, not shown. The tape cassette contains a wide tape (selected from a plurality of tapes of widths varying with the tape cassette type) and a printing ribbon (selected from a plurality of multiple color printing ribbons that vary with the tape cassette type). In a front position, inside the section T, is a known thermal head H (see FIG. 2) that prints characters and graphic forms onto the tape. The tape cassette accommodating section T is equipped with a swingingly attached lid 2 that opens to permit replacement of the tape cassette inside. A lock member 3 locks the lid 2 in its closed position. The tape cassette, thermal head H and the related components are of known structure and will not be discussed further.

The display device D displays characters and graphic forms input via the keyboard K and/or the electronic pen P (both to be described later). The display device is composed of a character display part 4A and a print data display part 4B. The character display part 4A is a liquid-crystal display that indicates character data input from the keyboard K, a mode type (to be discussed later), and a message for describing the operation to be carried out. The print data display part 4B is a combination of a liquid-crystal display with a transparent touch-sensitive panel A (see FIG. 2). The print data display part 4B displays: a handwritten graphic form entered with the electronic pen P operated on the transparent touch-sensitive panel A; image data read by an image scanner 9 (to be described later) connected to the electronic pen P; and print data (character data, etc.) transferred from the character display part 4A.

The keyboard K has character keys 5 for inputting various characters and symbols, cursor keys 6, a return key 7, a kana-kanji conversion key C, a backspace key BS, a kana input mode key E and an alphabetic character input mode key F. To the rear of the keyboard K (top in FIG. 1) are mode keys 8 for setting various modes. Of these keys, a character input mode key 8A, when operated, sets a mode in which to input characters entered from character keys 5 on the keyboard K. The characters entered from the character keys 5 are first displayed on the character display part 4A for correction and other editing operations. Operating the return key 7 finalizes the entered characters and transfers them to the print data display part 4B. Thereafter, the electronic pen P is used to determine data positions.

A scanner key 8B is used to set a mode in which to read image data representing graphic forms from the image scanner 9 (to be discussed later) connected to the electronic pen P. The image data collected by the image scanner 9 are displayed on the print data display part 4B. While the image data are being displayed, changes and corrections may be made to the data. The image data thus edited are then positioned where appropriate.

An image key 8C is used to set a mode in which to input freehand (i.e., handwritten) data using the electronic pen P whose tip is moved manually over the touch-sensitive panel A of the print data display part 4B. The freehand data are displayed on the print data display part 4B.

The above three modes may be used repeatedly for data input until the desired print data have been created.

An edit key 8D is used to set a mode in which to edit data as desired, the data having been created in the various other modes. For editing, the data are displayed on the print data display part 4B. The electronic pen P is then used to position the respective pieces of the displayed data where appropriate. The editing of the data is made possible because the data created in various modes are stored independently in a RAM 21, as will be described later.

A print key 8E is used to issue a print command to the thermal head H. Pushing the print key 8E causes the thermal head H to print, onto the wide tape in the tape cassette, the character data and image data displayed on the print data display part 4B. A function key 8F is used to designate various print-related functions. One such function that may be designated by the key 8F is the color in which to print each of the different data displayed on the print data display part 4B. Another print-related function that may be designated is the width of the tape contained in the tape cassette.

The electronic pen P is connected via a cable 10 to the right-hand side of the tape printing apparatus 1 (as seen in FIG. 1) and located near the keyboard K. The image scanner 9 is attached to one side of the electronic pen P. The electronic pen P has a lock key 11 and an on/off key 12. The lock key 11 is used to lock the image scanner 9 in its inactive state and to unlock it from that state. The on/off key 12 is used to turn on and off the image scanner 9. When inputting image data on an object through the image scanner 9, the user first operates the lock key 11 to unlock the scanner 9. Then the user moves the image scanner 9 over the object to scan it while holding down the on/off key 12.

Figure 2:
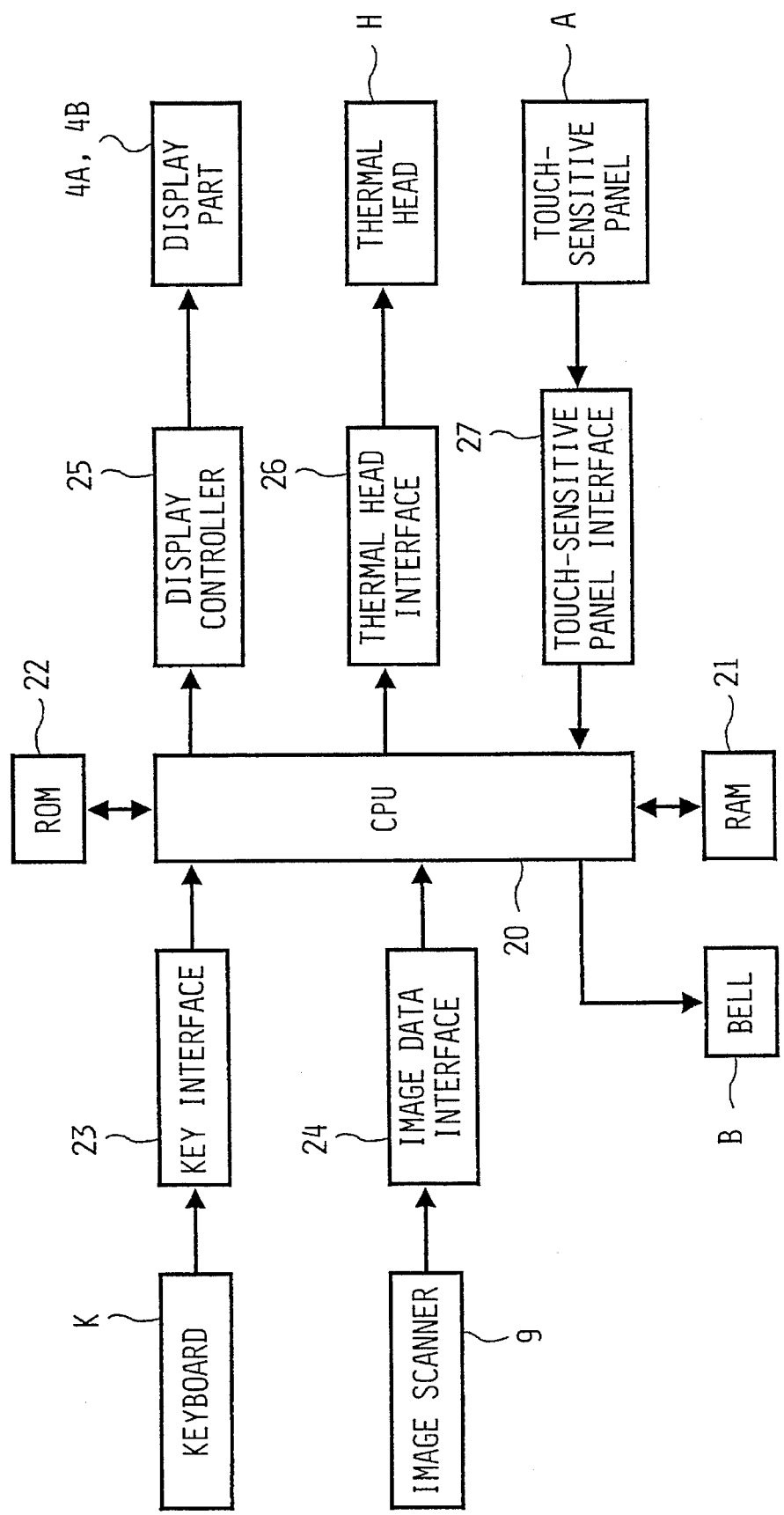
FIG. 2 is a block diagram of a control system in the embodiment.

Described below with reference to FIG. 2 is how the control system of the tape printing apparatus 1 having the above described structure works. FIG. 2 is a block diagram of the control system. The CPU 20 provides overall control over the tape printing apparatus 1. The CPU 20 has a RAM 21 and a ROM 22.

Figure 3:
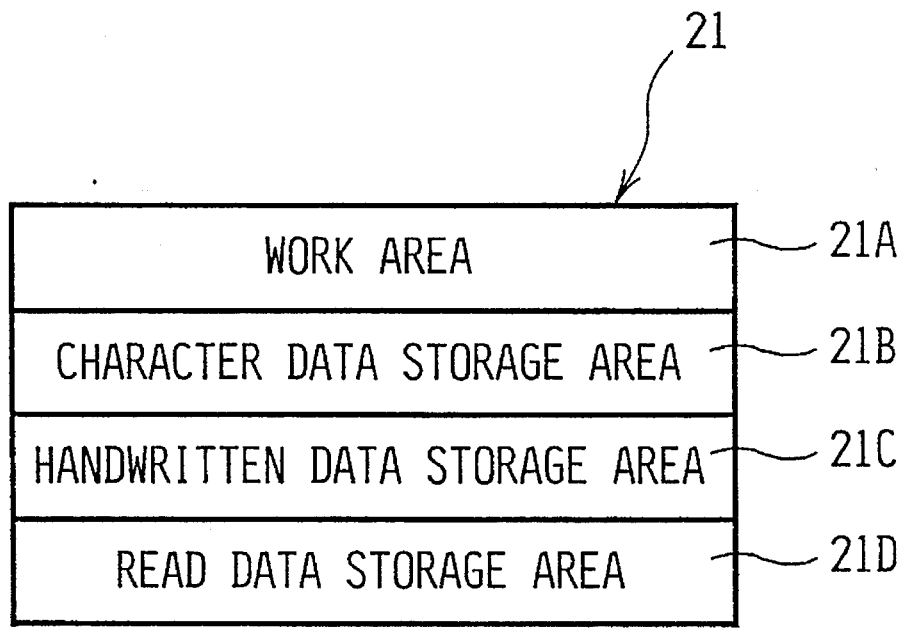
FIG. 3 is a schematic view showing how a RAM of the embodiment is divided into various storage areas.

The RAM 21 has four storage areas as shown in FIG. 3, i.e., work area 21A, character data storage area 21B, handwritten data storage area 21C and read data storage area 21D, for accommodating the results of various calculations made by the CPU 20. The work area 21A stores variables and other data needed to execute various programs held in the ROM 22. The character data storage area 21B stores text data composed of characters, numbers, and symbols entered through the keyboard K. The handwritten data storage area 21C stores data on handwritten graphic forms, characters, numbers or symbols entered using the electronic pen P. The read data storage area 21D accommodates image data entered using the image scanner 9. These different kinds of data coming from the various data input units are stored independently in their respective storage areas of the RAM 21.

Figure 4:
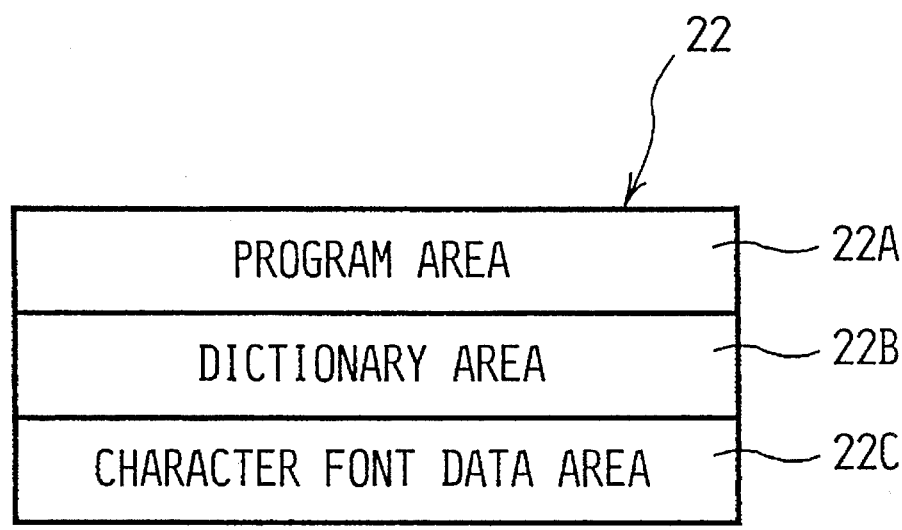
FIG. 4 is a schematic view depicting how a ROM of the embodiment is divided into various storage areas.

The ROM 22 has three storage areas as depicted in FIG. 4, i.e., a program area 22A, a dictionary area 22B and a character font data area 22C for accommodating various programs to be described later. The program area 22A stores a number of programs needed to control the tape printing apparatus 1. The dictionary area 22B holds dictionaries necessary for converting from kana to kanji the code data, such as characters, entered from the keyboard K. The character font data area 22C accommodates character font data required for display on the display parts 4A and 4B as well as for printing by the thermal head H.

Referring again to FIG. 2, the character data entered from character keys 5 on the keyboard K are forwarded to the CPU 20 through a key interface 23. When the entered character data is kana data, the CPU 20 converts the received character data from kana to kanji using the dictionary area 22B of the ROM 22. The converted data are placed in the character data storage area 21B of the RAM 21. The image data on graphic forms read through the image scanner 9 are input to the CPU 20 via an image data interface 24. The CPU 20 places the image data into the read data storage area 21D of the RAM 21. The handwritten data entered using the touch-sensitive panel A are sent to the CPU 20 via a touch-sensitive panel interface 27. The CPU stores the handwritten data in the handwritten data storage area 21C of the RAM 21.

The character data, image data and handwritten data thus entered are displayed on the display parts 4A and 4B through a display controller 25. The displayed data are also printed by the thermal head H onto a tape via a thermal head interface 26.

A bell B is connected to the CPU 20. The CPU 20 activates the bell B as needed, as will be described later.

Figure 5:
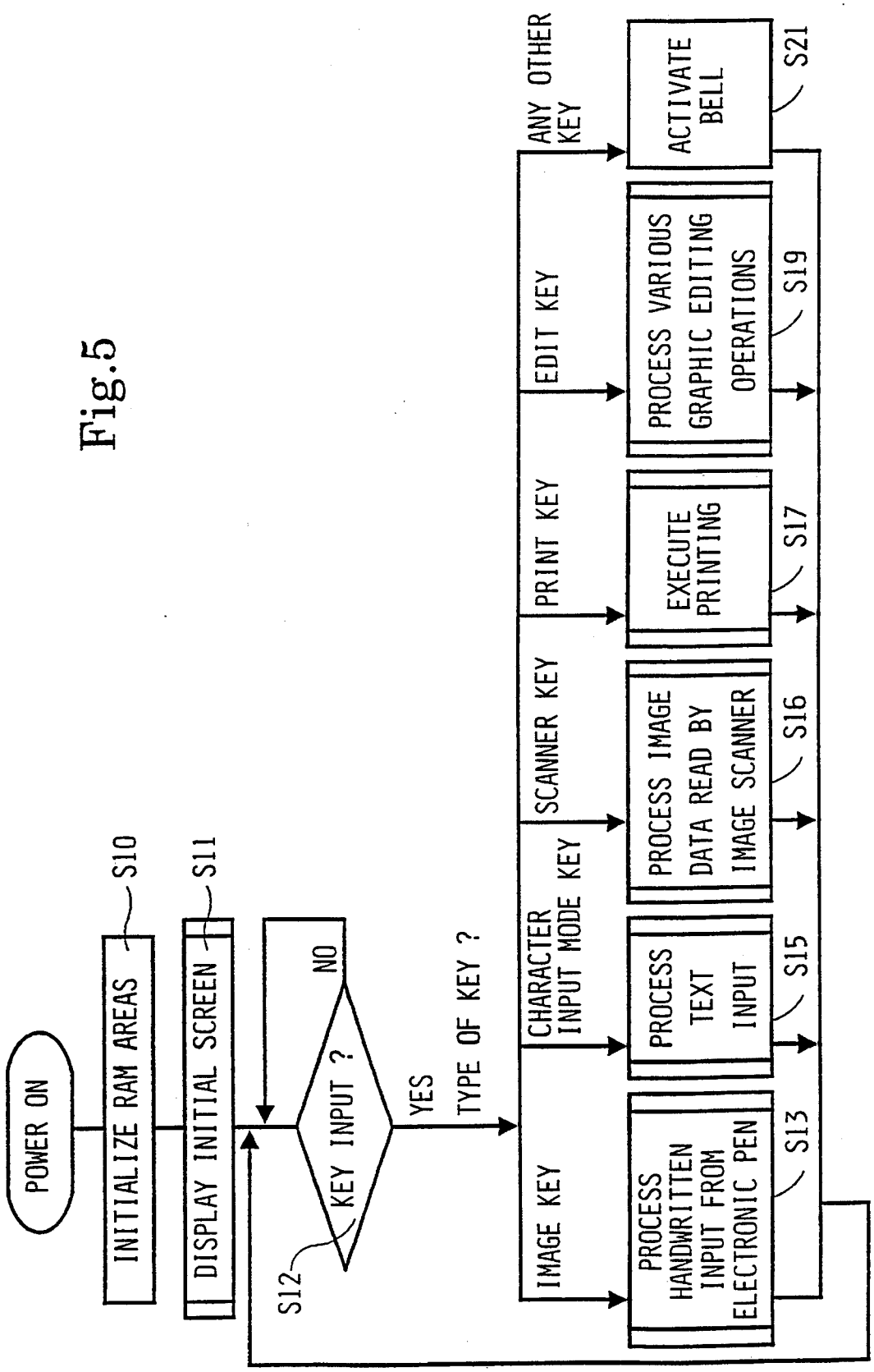
FIG. 5 is a flowchart of steps of the main program in the embodiment.
Figure 6:
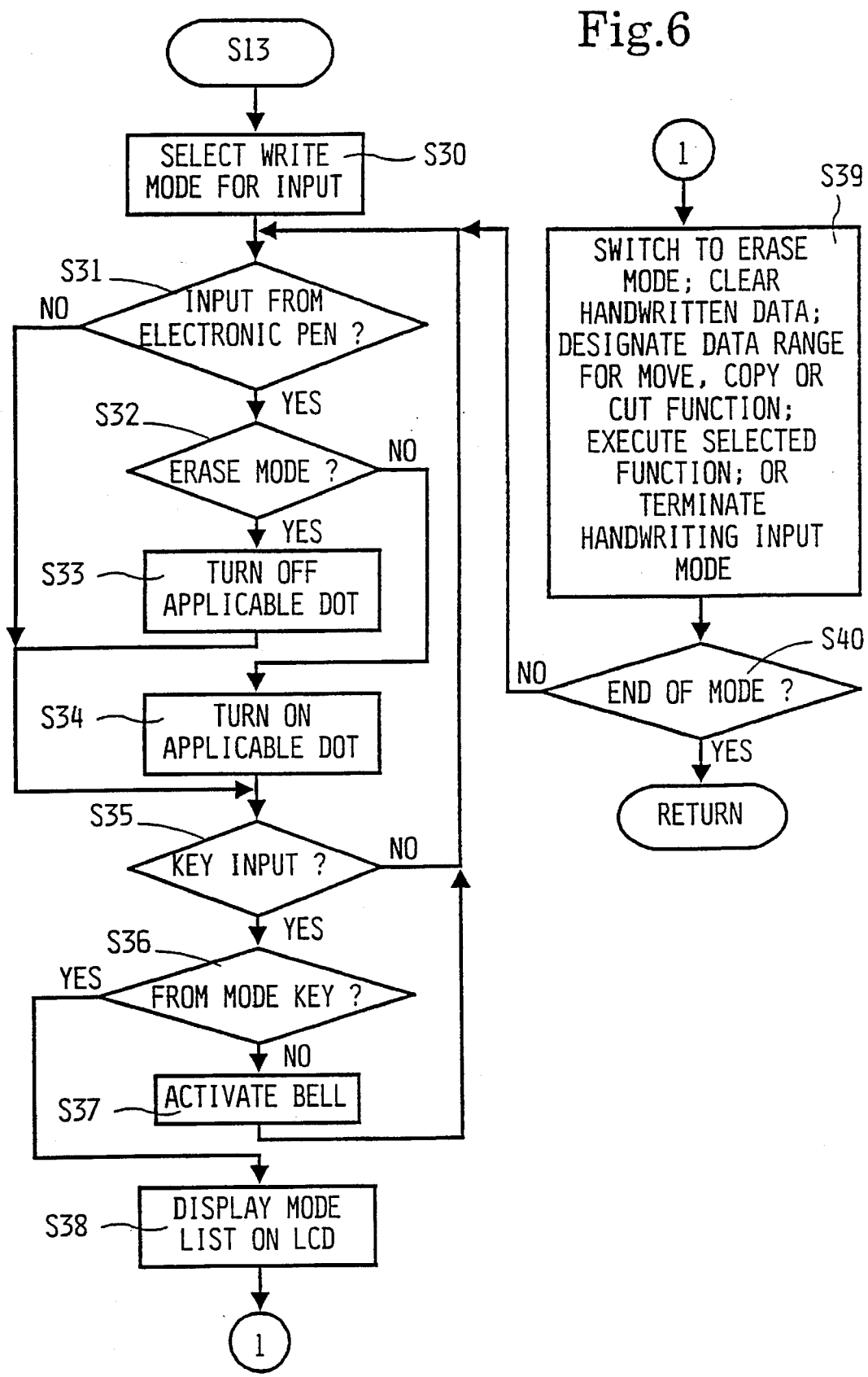
FIG. 6 is a flowchart of steps of a handwriting input processing program for use with an electronic pen connected to the embodiment.
Figure 7:
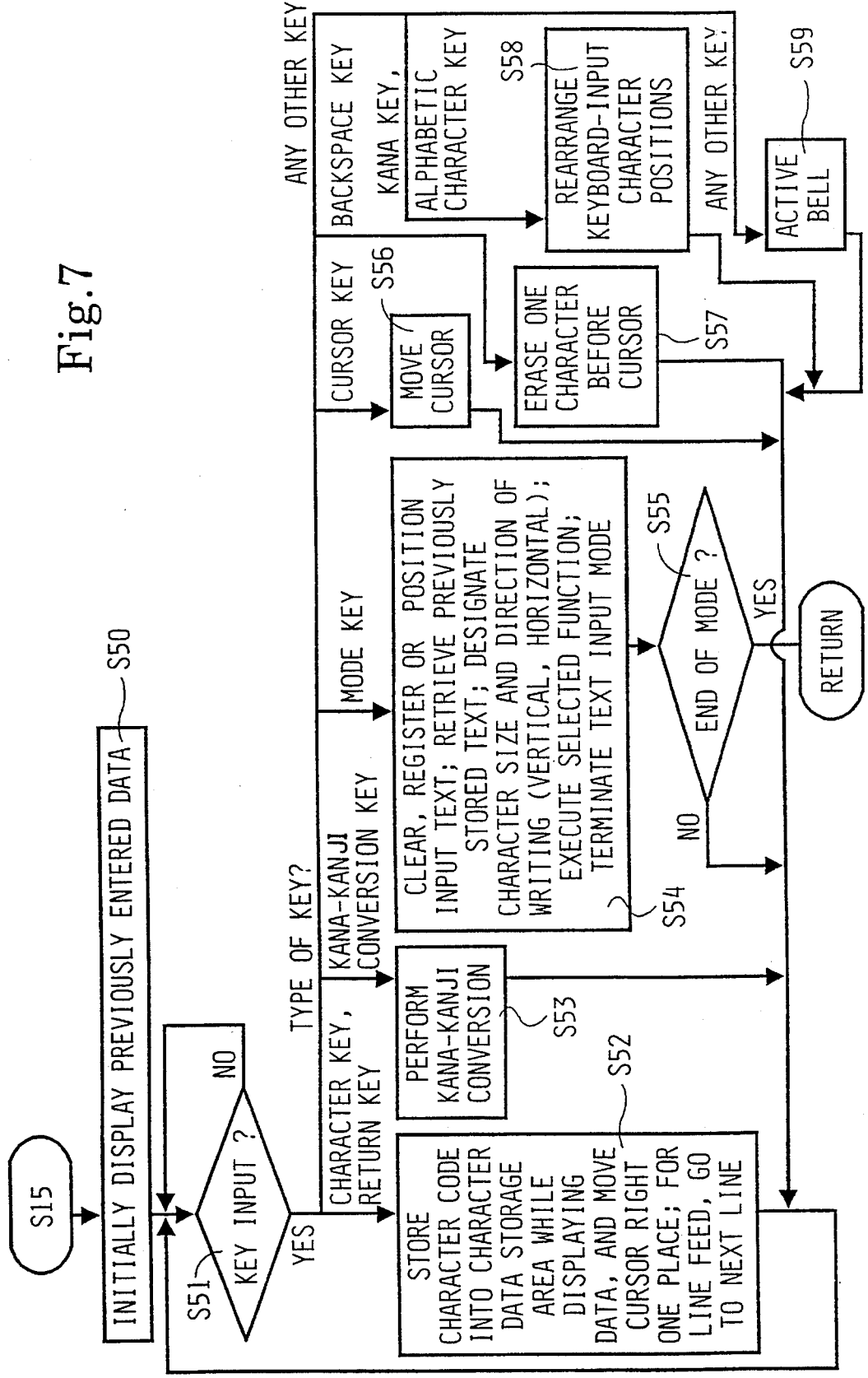
FIG. 7 is a flowchart of steps of a text input processing program for use with the embodiment.
Figure 8:
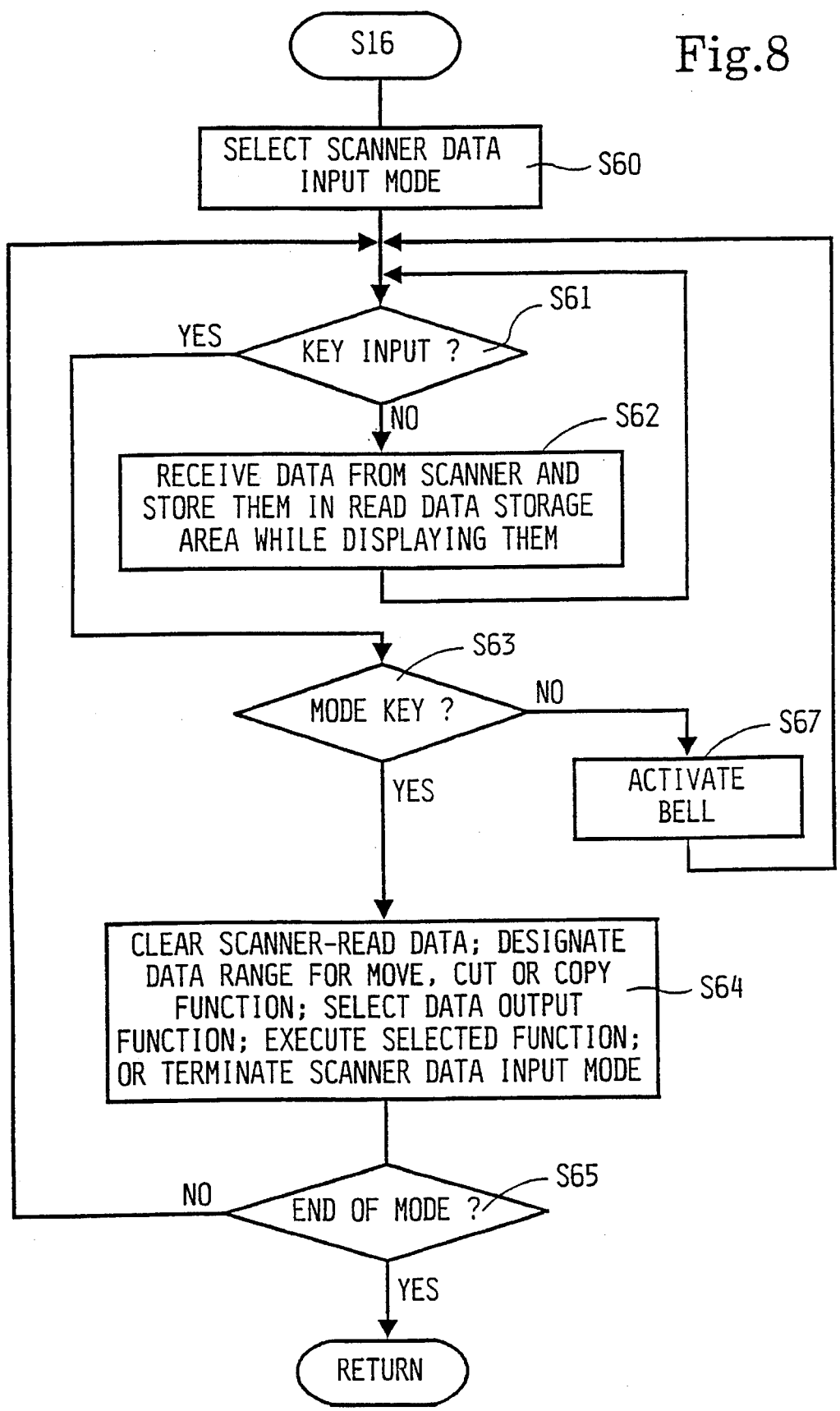
FIG. 8 is a flowchart of steps of an image read processing program for use with an image scanner connected to the embodiment.

Operation of the tape printing apparatus 1 will now be explained with reference to FIGS. 5 through 10. FIG. 5 is a flowchart of the main program for the tape printing apparatus 1, FIG. 6 is a flowchart of a handwriting input processing program for use with the electronic pen P, FIG. 7 is a flowchart of a text input processing program for use with the apparatus 1, FIG. 8 is a flowchart of an image read processing program for use with the image scanner 9, FIG. 9 is a flowchart of a print processing program for use with the apparatus 1, and FIG. 10 is a flowchart of an edit processing program for dealing with characters and graphic forms in conjunction with the apparatus 1.

The main program of FIG. 5 operates as follows. When power is applied to the tape printing apparatus 1, step 10 is entered in which the various storage areas and flags of the RAM 21 are initialized. In step 11, initial screens appear on the display parts 4A and 4B. In step 12, a check is made to see if a key input is received from any of the mode keys 8. If no key input is detected (NO in step 12), the program waits for a key input to arrive. If a key input is detected (YES in step 12), the type of key operated is identified.

If the key input is found to be from the image key 8C, handwriting input processing is performed with the electronic pen P in step 13. If the key input is found to be made from the character input mode key 8A, text input processing is carried out in step 15. If the key input is from the scanner key 8B, image read processing is conducted in step 16 with the image scanner 9. If the key input is from the print key 8E, print processing is performed in step 17. If the key input is from the edit key 8D, various character and image editing operations are carried out in step 19. Steps 13, 15, 16, 17 and 19 will be described later in detail. If the key input is found to have come from a key other than the mode keys 8, the bell B is activated in step 21. When any of the steps 13 through 21 outlined above is completed, step 12 is reached again for processing another key input.

The handwriting input processing of step 13 will now be described in detail with reference to FIG. 6. When the key input of the image key 8C is detected, write mode is selected in step 30. In step 31, a check is made to see if the input comes from the electronic pen P. If the input is from the electronic pen P (YES in step 31), step 32 is reached. If the input is not from the electronic pen P (NO in step 31), step 35 is reached.

In step 32, a check is made to see if erase mode is entered. If erase mode is in effect (YES in step 32), the applicable dot is turned off for erasure in step 33, and step 35 is reached. If erase mode is not in effect (NO in step 32), the applicable dot is turned on and accepted before step 35 is reached.

In step 35, a check is made to see if any key is operated on the keyboard K. If no key input is detected (NO in step 35), step 31 is reached again; if a key input is detected (YES in step 35), step 36 is reached. In step 36, a check is made to see if the key input comes from any of the mode keys 8. If the key input is not from any mode key 8 (NO in step 36), the bell B is activated in step 37 before step 31 is reached. If the key input comes from any of the mode keys 8 (YES in step 36), a mode list is displayed on the display part 4A in step 38, followed by step 39. In step 39, erase mode and write mode are switched, handwritten data are cleared, a data range is designated (for MOVE, COPY or CUT function), the selected function is executed, or handwriting mode is terminated. If the user chooses to terminate handwriting mode (YES in step 40), handwriting mode is terminated and control is returned to the main program. If any other choice is made in step 40, step 31 is reached again.

The text input processing of step 15 will now be described in detail with reference to FIG. 7. When the key input from the character input mode key 8A is detected, step 50 is reached in which the previously entered text data are initially displayed on the display part 4A. In step 51, a check is made to see if any key input is made from the keyboard K. If there is no key input (NO in step 51), the system waits for a key input to arrive. If a key input is detected (YES in step 51), the type of the operated key is identified.

If the key input comes from any character key 5, step 52 is reached. In step 52, the corresponding character code data are stored in the character data storage area 21B, the character is displayed on the display part A, and the cursor is moved right one place. If the key input is found to come from the return key 7, line feed is performed and the cursor is moved to the next line in step 52, and step 51 is reached again.

If the key input comes from the kana-kanji conversion key C, step 53 is reached in which the currently selected character string is converted from kana to kanji, before step 51 is reached. If the key input comes from any of the mode keys 8, step 54 is reached. In step 54, the input text is cleared, registered or positioned; previously stored text is retrieved; the character size and the direction of writing (vertical or horizontal) are selected; the selected function is executed; or text input mode is terminated. If text input mode is found to be terminated (YES in step 55), control is returned to the main program. If text input mode is yet to be terminated (NO in step 55), step 51 is reached again.

If the key input comes from a cursor key 6, step 56 is reached in which the cursor is moved accordingly, before step 51 is reached. If the key input comes from the backspace key BS, step 57 is reached in which one character before the cursor is erased, and step 51 is reached. If the key input comes from a key other than those mentioned following step 15 and if the operated key is the kana input mode key E or alphabetic character input mode key F, step 58 is reached. In step 58, the input character positions are rearranged by use of the keyboard K, and step 51 is reached. If the key input comes from a key other than those mentioned between step 15 and step 58, the bell B is activated in step 59, followed by step 51.

The image read processing of step 16 will now be described in detail with reference to FIG. 8. When the key input is found to come from the scanner key 8B, step 60 is reached in which scanner data input mode is selected. In step 61, a check is made to see if there is any key input from the keyboard K. If a key input from the keyboard K is detected (YES in step 61), step 63 is reached. If no key input is detected from the keyboard K (NO in step 61), step 62 is reached. In step 62, the image data received from the image scanner 9 are stored into the read data storage area 21D while being displayed on the display part 4B, and step 61 is reached again. In step 63, a check is made to see if the key input comes from any of the mode keys 8. If the key input is found to come from any mode key 8 (YES in step 63), a mode list is displayed on the display part 4A in step 64. In the mode list of step 64, the scanner-read data are cleared; a data range is designated (for MOVE, CUT or COPY function); a data output function is selected; the selected function is executed; or scanner data input mode is terminated. If the user chooses to terminate scanner data input mode (YES in step 65), control is returned to the main program. If scanner data input mode has yet to be terminated (NO in step 65), step 61 is reached. If the key input is found to come from a key other than the mode keys 8 in step 63, the bell B is activated in step 67, before step 61 is reached again.

Figure 9A:
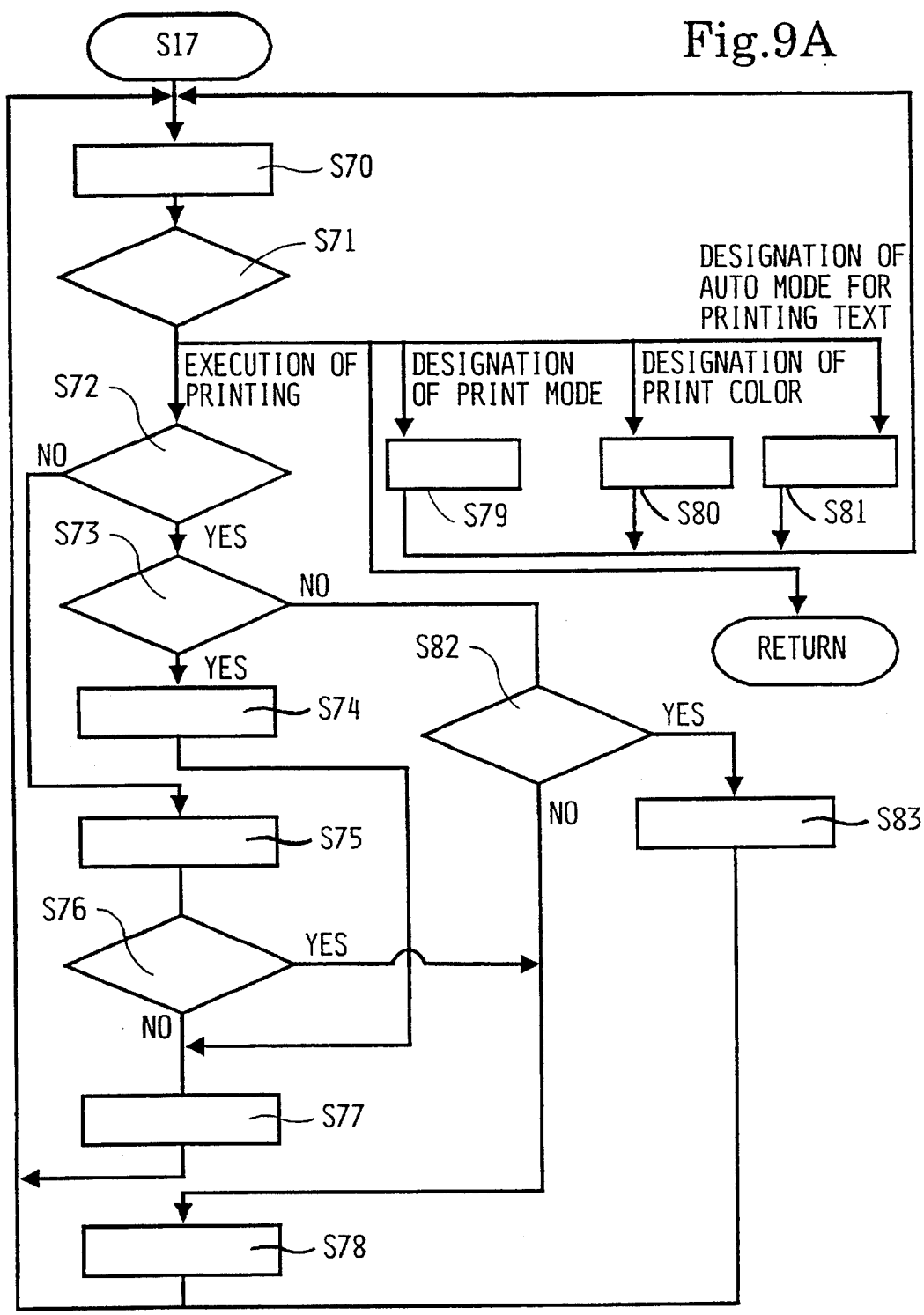
FIG. 9A is a flowchart of steps of a print processing program for use with the embodiment.

The print processing of step 17 will now be described in detail with reference to FIGS. 9A and 9B. When the key input is found to come from the print key 8E, the function selection mode is entered in step 70. In this mode, various functions are offered for selection by the user: designating print mode in which to print either current data or text data; designating text printing; designating the tape width; designating the print color; designating AUTO mode for text printing; executing the print operation; or terminating print mode. In step 71, a check is made to see which function has been selected.

If execution of the print operation is selected, steps 72 through 78 are carried out. If designation of print mode is selected, step 79 is reached in which the current data or text data are designated for printing. If designation of the print color is selected, any one of black, white, red and blue is selected in step 80. The print colors are bands of ink on the ink tape, each color band being as wide as the tape. If designation of AUTO mode is selected for text printing, whether to turn on or off AUTO mode is determined in step 81. Step 79, 80 or 81 is followed by step 70.

If execution of the print operation is selected in step 71, step 72 is first entered. In step 72, a check is made to see if the current data are to be printed. If printing of the current data is selected (YES in step 72), step 73 is reached. In step 73, a check is made to see if the tape cassette accommodating section T holds a tape cassette containing a wide tape. If the tape cassette is determined to contain a wide tape (YES in step 73), step 74 is reached. In step 74, the current data (i.e., data currently displayed on the display part 4B) are set as print data. Step 74 is followed by step 77 in which the print data are printed in the designated print color, by the thermal head H, onto the wide tape. Step 77 is followed by step 70. If the tape cassette containing the wide tape is not found in the tape cassette accommodating section T (NO in step 73), step 82 is reached in which it is determined if auto mode is selected. If auto mode is not selected, step 78 is reached, the bell B is activated and an error indication is displayed on the display part 4A. Step 78 is followed by step 70.

If auto mode is selected in step 82, then step 83 is reached in which the current data size is adjusted according to the tape width, and the process returns to step 70.

If the current data are not to be printed (NO in step 72), step 75 is reached. In step 75, the text data are set as print data, and a check is made to see if the text data are printable in view of the tape width, character size and the number of lines to be printed. If AUTO mode is selected, the character size is adjusted automatically as needed. If the adjustments fail to make the text data printable, an error is recognized. Step 76 checks to see if such an error has occurred. In case of error (YES in step 76), step 78 is reached; if no error is detected (NO in step 76), step 77 is reached.

If termination of print mode is selected, control is returned to the main program.

The edit processing of step 19 will now be described in detail with reference to FIG. 10. If the key input is found to come from the edit key 8D, step 90 is reached. In step 90, the user selects text data, handwritten data or scanner-read data for editing. Step 90 is followed by step 91 in which any of the various edit functions (add, delete, move, rotate, magnify, contract) may be selected.

If the add function is selected, step 92 is reached in which the current data are added to the data being displayed on the display part 4B. If the delete function is selected, step 93 is reached in which the current data are deleted from the data displayed on the display part 4B. If the move function is selected, step 94 is reached in which the current data are enclosed by a frame and the data are moved so that the position pushed by the electronic pen P will come to be the top left corner of the frame. Where the current data are to be moved using cursor keys 6, the data are moved, in step 94, one dot in the same direction as the cursor every time the cursor is moved by one dot.

If the rotate function is selected, step 95 is reached in which the current data are rotated by 90 degrees by use of one of the cursor keys 6. For example, pressing the cursor key (→) rotates the current data 90 degrees clockwise; pushing the cursor key (←) rotates the current data 90 degrees counterclockwise. If the magnify/contract function is selected, step 96 is reached. The magnify/contract function is effective only when the current data are text data. In step 96, pressing the cursor key (↑) magnifies the text data; pushing the cursor key (↓) contracts the text data.

Any one of steps 92 through 96 is followed by step 90. If termination of edit mode is selected, control is returned to the main program.

As described, the tape printing apparatus 1 embodying the invention has the RAM 21 divided into the character data storage area 21B, handwritten data storage area 21C and read data storage area 21D. The character data storage area 21B stores the data on characters entered from the keyboard K. The handwritten data storage area 21C accommodates handwritten data on graphic forms and others entered from the electronic pen P and the touch-sensitive panel A. The read data storage area 21D holds the image data read through the image scanner 9. The entered data are stored independently in their respective storage areas for editing. The scheme makes it possible to print not only characters but also graphic forms concurrently onto the tape. The inventive tape printing apparatus having the above feature is a significant improvement over its prior art counterparts in that tapes are thereby created to meet the more diverse demands and needs of today's users than ever before.

As many apparently different embodiments of this invention may be made without departing from the spirit and scope thereof, it is to be understood that the invention is not limited to the specific embodiments described except as defined in the appended claims.

What is claimed is:

1. A tape printing apparatus having character data input means and print means, said print means receiving from said character data input means the character data for printing characters, numbers and symbols onto a tape, said tape printing apparatus comprising:

image data input means for inputting image data representing graphic forms, said image data input means comprises a first image data input device for inputting hand-written image data;

display means for displaying the data received from said character data input means and from said image data input means;

storage means for storing independently said character data from said character data input means and said image data from said image data input means;

editing means for selecting and combining the character data and image data retrieved from said storage means, said editing means permitting the character and image data to be positioned separately; and data processing means for combining the character data and image data in accordance with a layout as produced by said editing means for subsequent printing.

2. The tape printing apparatus as claimed in claim 1, wherein said image data input means further comprises a second image data input device for inputting read image data.

3. The tape printing apparatus as claimed in claim 2, wherein said storage means separately stores the handwritten image data from the read image data.

4. The tape printing apparatus as claimed in claim 2, wherein said second image data input device is a scanner.

5. The tape printing apparatus as claimed in claim 2, wherein the first image data input device is an electronic pen and the tape printing apparatus further comprises a touchpad display screen.

6. A tape printing apparatus, comprising:

a keyboard;

a plurality of mode keys;

a display;

print means for printing on a tape printing medium;

an electronic pen input device;

a touchpad overlaying at least a part of a screen of said display for use with said electronic pen input device, said touchpad and said electronic pen input device for inputting hand-written image data;

image data input means for inputting image data representing graphic forms;

a random access memory for storing data in mutually exclusive storage areas input from said keyboard, said electronic pen input device and said touchpad, and said image data input means;

editing means for selecting which data to combine from the data stored in the mutually exclusive storage areas contained in said random access memory and for separately arranging the data; and data processing means for combining the selected data in a layout as arranged by said editing means for subsequent printing.

7. The tape printing apparatus as claimed in claim 6, wherein said image data input means is a scanner for electronically reading image data from preprinted medium.

8. The tape printing apparatus as claimed in claim 6, wherein the plurality of mode keys comprise at least a key for designating a character key input mode, a scanner mode, an electronic pen and touchpad mode, an edit mode and a print mode.

9. The printing apparatus, as claimed in claim 6, wherein said electronic pen input device further comprises an on/off key and a lock key.

10. The tape printing apparatus as claimed in claim 6, wherein said display is divided into two parts, a first part for displaying data received from the keyboard and a second part for displaying a one of image data and data to be printed.

11. The tape printing apparatus as claimed in claim 6, wherein said keyboard inputs character data to include letters, numbers and symbols and said image data input means inputs image data representing graphic forms.

12. A tape printing apparatus, comprising:

image data input means for inputting image data, said image data input means including a first image data input device for inputting hand-written image data;

storage means for storing the image data input by said image data input means;

character data input means for inputting character data;

storage means for storing the character data separate from the image data;

editing means for designating and separately arranging the image data with the character data to create a layout; and print means for printing the image data and the character data on a tape in accordance with the layout as produced by said editing means.

13. The tape printing apparatus as claimed in claim 12, wherein said image data input means includes a second image data input device for inputting read image data.

14. The tape printing apparatus as claimed in claim 12, wherein said storage means storage of the image data separate from the character data further separates the image data using a read image storage area for storing the read image data and a hand-written image storage area for storing the hand-written image data.

15. The tape printing apparatus as claimed in claim 13, wherein said second image data input device includes an image scanner and said first image data input device includes an electronic pen and a touchpad for use with the electronic pen.

16. The tape printing apparatus as claimed in claim 12, further comprising display means for displaying the image data and the character data input by said image data input means and character data input means, wherein said display means is divided into two parts, a first part for displaying the data for printing and a second part for displaying a one of the character data for editing and mode selection data.

17. The tape printing apparatus as claimed in claim 12, wherein said print means prints the image and character data in accordance with the width of the tape when an edit mode for adjusting the size of the image data is selected.

* * * * *